United States Patent
Heise

(10) Patent No.: US 8,910,651 B2
(45) Date of Patent: Dec. 16, 2014

(54) THERMAL PRESSURE RELIEF DEVICES AND RELATED SYSTEMS AND METHODS

(71) Applicant: GM Global Technology Operations LLC, Detroit, MI (US)

(72) Inventor: Axel Heise, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/801,187

(22) Filed: Mar. 13, 2013

(65) Prior Publication Data

US 2014/0261742 A1    Sep. 18, 2014

(51) Int. Cl.
*F16K 17/14*    (2006.01)
*F16K 37/00*    (2006.01)

(52) U.S. Cl.
CPC .................. *F16K 37/0083* (2013.01)
USPC ......... 137/72; 137/68.13; 137/68.18; 137/74; 137/76; 137/79; 169/41

(58) Field of Classification Search
CPC ....... F16K 17/16; F16K 17/40; F16K 17/003; F16K 17/403; F16K 17/383; F16K 37/0041; F16K 37/0058; H01M 8/04223; H01M 8/04201; Y02E 60/50
USPC ................... 137/74, 72, 76, 79, 68.13, 68.18; 169/41
See application file for complete search history.

(56) References Cited

U.S. PATENT DOCUMENTS

| | | | | |
|---|---|---|---|---|
| 4,263,929 A | * | 4/1981 | Kearney | 137/68.18 |
| 4,270,560 A | * | 6/1981 | Kearney | 137/68.14 |
| 4,365,643 A | * | 12/1982 | Masclet et al. | 137/70 |
| 4,408,194 A | * | 10/1983 | Thompson | 340/626 |
| 4,951,697 A | * | 8/1990 | Fritts | 137/68.18 |
| 4,978,947 A | * | 12/1990 | Finnegan | 340/611 |
| 5,313,194 A | * | 5/1994 | Varos | 340/626 |
| 5,583,490 A | * | 12/1996 | Santos et al. | 340/626 |
| 6,286,536 B1 | * | 9/2001 | Kamp et al. | 137/68.13 |
| 6,321,771 B1 | * | 11/2001 | Brazier et al. | 137/68.23 |
| 6,866,057 B1 | * | 3/2005 | Buehrle, II | 137/74 |
| 8,141,574 B2 | * | 3/2012 | Weatherly et al. | 137/72 |
| 8,434,507 B2 | * | 5/2013 | Iida et al. | 137/72 |
| 2005/0150548 A1 | * | 7/2005 | Kita et al. | 137/72 |
| 2008/0105310 A1 | * | 5/2008 | Ogami et al. | 137/557 |
| 2010/0307605 A1 | * | 12/2010 | Schmalfuss | 137/72 |
| 2013/0008521 A1 | * | 1/2013 | Klug et al. | 137/72 |
| 2013/0146147 A1 | * | 6/2013 | Heise | 137/12 |

* cited by examiner

*Primary Examiner* — John K Fristoe, Jr.
*Assistant Examiner* — Minh Le
(74) *Attorney, Agent, or Firm* — Phillips Ryther & Winchester; Matthew D. Thayne

(57) ABSTRACT

Apparatus, methods and systems for inspecting and/or sensing defects in a thermal pressure relief device. The thermal pressure relief apparatus may comprise a bulb having a fluid therein. In some implementations, a sensor may be used to determine whether the fluid within the bulb exceeds a fill level threshold. Upon determining that the fluid is below the fill level threshold, an action may be taken. In some implementations, the action may comprise providing a notification.

19 Claims, 4 Drawing Sheets

THERMAL PRESSURE RELIEF DEVICES AND RELATED SYSTEMS AND METHODS

TECHNICAL FIELD

This disclosure relates to apparatus, methods, and systems for inspecting and/or sensing defects in a thermal pressure relief device. For example, in some embodiments, this disclosure relates to thermal pressure relief devices in fuel cell vehicles comprising one or more sensors for detecting a condition of a component of the device, such as a fluid level of a glass bulb for example.

BACKGROUND

Hydrogen-powered fuel cell vehicles typically employ high-pressure tanks or other vessels containing compressed hydrogen gas. Such high-pressure vessels often include one or more pressure relief devices. Such pressure relief devices may be located at an end of the high-pressure vessel at which location various valves, pressure regulators, connectors, excess flow limiters, and the like may be located to allow the vessel to be filled with compressed hydrogen gas to "re-fuel."

Such pressure relief devices may be thermally activated. In other words, when the hydrogen gas is exposed to high temperatures, the pressure relief device may be activated to relieve pressure that otherwise could result in rupturing of the vessel. Some such pressure relief devices comprise a fragile bulb comprising a liquid that is exposed to heat from the vehicle and/or vessel. When heated to a predetermined temperature, the bulb is configured to burst, thereby opening a vent and allowing the hydrogen gas to exit the vessel.

However, since such devices may rely on the presence of a liquid in order to burst at the predetermined temperature, it may be imperative that a user or technician be notified in the event that the bulb loses some or all of its liquid. This may occur, for example, if the bulb cracks but does not fully burst.

The present inventors have therefore determined that it would be desirable to provide apparatus, methods, and systems for inspecting and/or sensing defects in a thermal pressure relief device in order to detect, for example, losses in fluid in the bulb of such a device and/or defects in a condition of the bulb, and/or in order to overcome one or more other limitations of the prior art.

SUMMARY

Apparatus, methods, and systems are disclosed herein for inspecting and/or sensing defects in a thermal pressure relief device. Some embodiments and implementations may be particularly useful in connection with fuel-cell vehicles powered by a gas, such as hydrogen gas.

In some embodiments a thermal pressure relief apparatus may be provided comprising a housing, a gas inlet port configured to be fluidly coupled with a vessel comprising a gas, a gas outlet port fluidly coupled with the gas inlet port, and a piston. The piston may be configured to be moved between a closed position in which the piston blocks fluid communication between the gas inlet port and the gas outlet port and an open position in which the gas outlet port is in fluid communication with the gas inlet port. The device may further comprise a bulb positioned so as to keep the piston in the closed position. In some embodiments, the bulb may comprise a glass bulb or may comprise another material that is relatively fragile such that the bulb may break to actuate the thermal pressure relief device during certain conditions. The bulb may be further configured such that, once the bulb breaks, the piston is allowed to move to the open position.

The device may further comprise a sensor configured to detect a condition of the bulb. The sensor may comprise at least one of an optical sensor, a capacitive sensor, and a structure-borne noise sensor. The condition sensed by the sensor may comprise, for example, the presence of a crack in the bulb, or a volume of a fluid (such as a liquid) within the bulb. In embodiments configured to detect a volume of a liquid within the bulb, the bulb may comprise a gas bubble within the liquid when the bulb is intact, and the sensor may be configured to detect a volume of a fluid within the bulb by detecting a size of the gas bubble (since the size of the bubble may vary in accordance with the volume of liquid within the bulb).

Some embodiments may comprise at least one heat input opening positioned adjacent to the bulb. In such embodiments, the sensor may be positioned within the at least one heat input opening.

In an example of a vehicle according to one embodiment of the invention, the vehicle may comprise a gas vessel comprising a gas, such as hydrogen gas. In some embodiments, the vehicle may comprise a fuel cell electric vehicle. The gas vessel may comprise a vessel outlet port. The vehicle may further comprise a thermal pressure relief apparatus coupled with the gas vessel. The thermal pressure relief apparatus may comprise a gas inlet port fluidly coupled with the vessel outlet port, a gas outlet port fluidly coupled with the gas inlet port, and a piston. The piston may be configured to be moved between a closed position in which the piston blocks fluid communication between the gas inlet port and the gas outlet port and an open position in which the gas outlet port is in fluid communication with the gas inlet port.

The thermal pressure relief apparatus may further comprise a bulb, such as a glass bulb or a bulb that is otherwise fragile/breakable, positioned so as to keep the piston in the closed position. The bulb may be configured such that, once the bulb breaks, the piston is allowed to move to the open position. The thermal pressure relief apparatus may further comprise a sensor configured to detect a volume of a fluid within the bulb. In some embodiments, the fluid may comprise a gas bubble, and the sensor may be configured to detect a volume of the fluid by detecting a size of the gas bubble.

In some implementations of methods for inhibiting malfunction of a thermal pressure relief apparatus in a vehicle, the method may comprise inspecting a thermal pressure relief apparatus in a vehicle, wherein the thermal pressure relief apparatus comprises a bulb. The bulb may be fragile and/or breakable, and may comprise a fluid. The method may further comprise determining whether the fluid within the bulb exceeds a fill level threshold and, upon determining that the fluid is below the fill level threshold, taking an action comprising at least one of providing a notification, deactivating a system associated with the thermal pressure relief apparatus, replacing the thermal pressure relief apparatus, and repairing the thermal pressure relief apparatus.

In some implementations, the step of inspecting the thermal pressure relief apparatus may comprise sensing a volume of the fluid within the bulb using a sensor. If the fluid within the bulb comprises a gas bubble, the step of sensing a volume of the fluid within the bulb using a sensor may comprise sensing a size of the gas bubble.

In implementations in which that action comprises a notification, the notification may comprise at least one of a visual notification, such as a warning light, and an audible notification, such as a beeping noise.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with various embodiments of the present disclosure is provided below. While several embodiments are described, it should be understood that disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the apparatus, systems, and methods disclosed herein may be used to inspect and/or sense defects in a thermal pressure relief device. Some embodiments and implementations disclosed herein may be particularly useful in connection with fuel-cell vehicles, such as fuel-cells configured to operate using hydrogen gas. More specific embodiments and implementations will now be described in greater detail with reference to the accompanying drawings.

Figure 1:
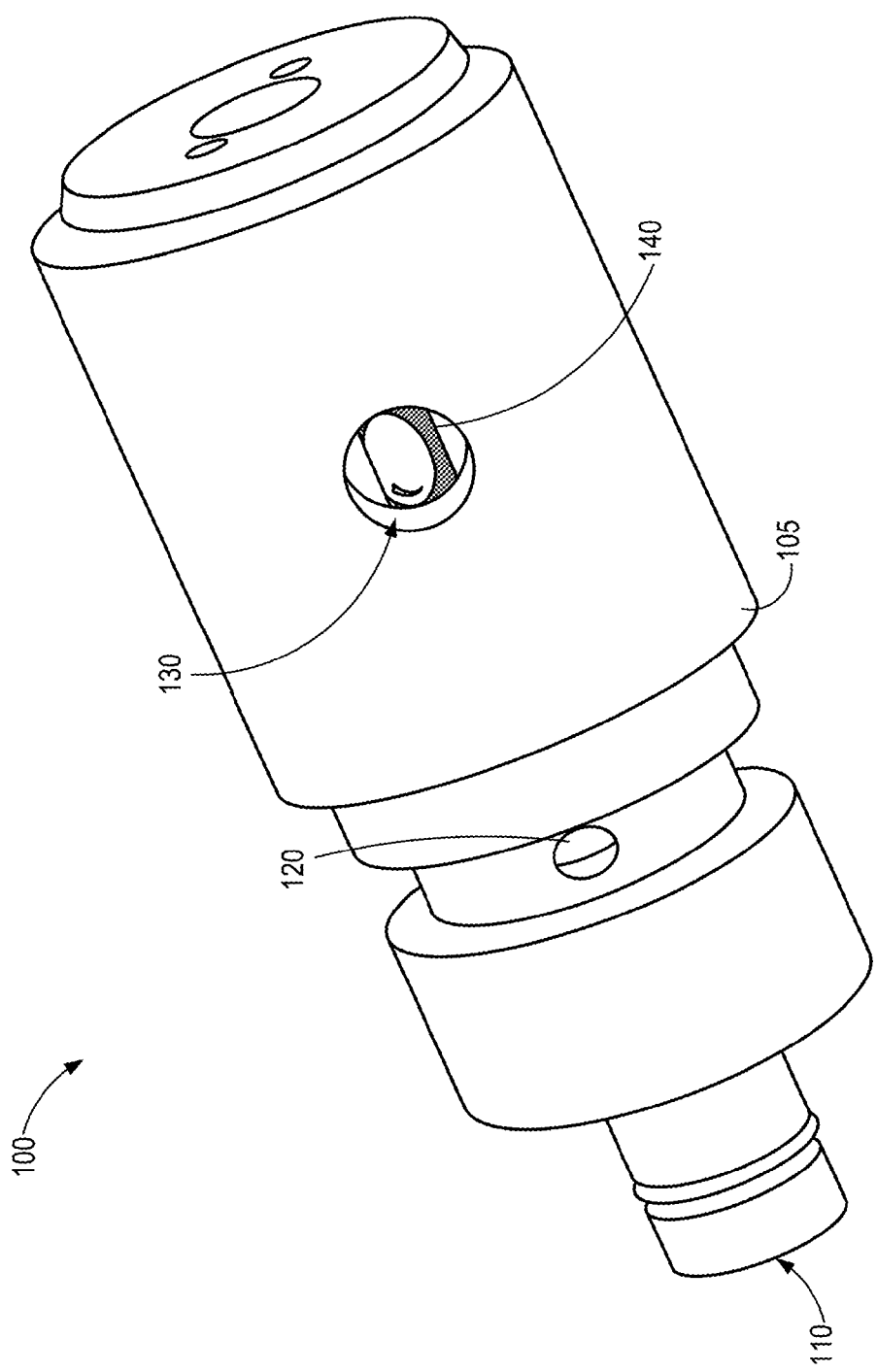
FIG. 1 is a perspective view of one embodiment of a thermal pressure relief apparatus.

FIG. 1 is a perspective view of an embodiment of a thermal pressure relief apparatus 100. Thermal pressure relief apparatus 100 may be configured to be coupled with a tank or other vessel comprising a gas, such as hydrogen, and, in some embodiments, may be included with a vehicle, such as a fuel-cell vehicle.

Figure 2:
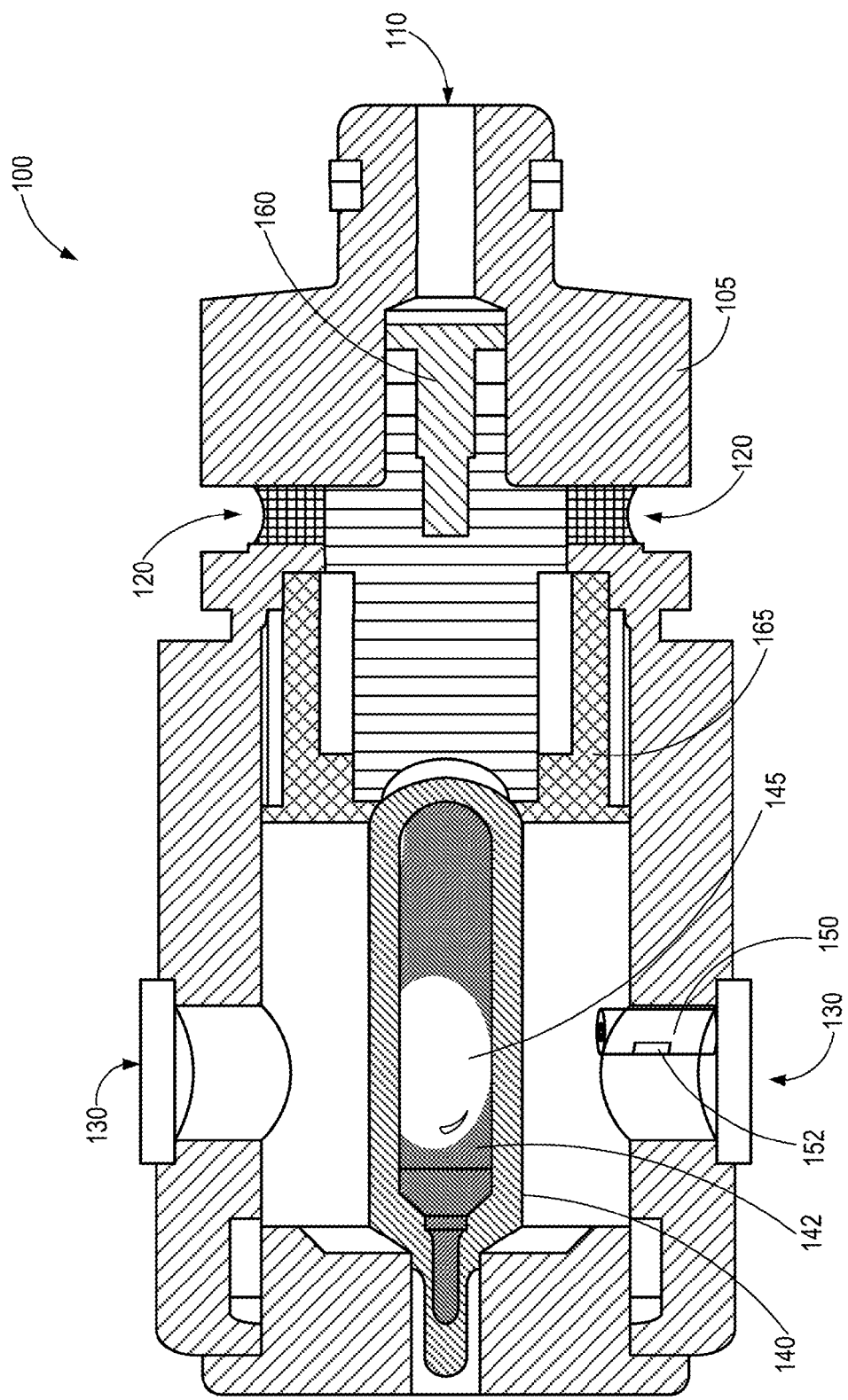
FIG. 2 is a cross-sectional view of an embodiment of a thermal pressure relief apparatus.

Thermal pressure relief apparatus 100 comprises a housing 105. Housing 105 comprises a gas inlet port 110. Gas inlet port 110 may be configured to be fluidly coupled with a vessel comprising a gas, such as hydrogen gas for example. Gas inlet port 110 may also be fluidly coupled with one or more gas outlet ports 120 on thermal pressure relief apparatus 100. As such, when a passage connecting gas outlet port(s) 120 and gas inlet port 110 is unobstructed, as discussed in greater detail below, gas from the gas tank/vessel may be allowed to exit the tank/vessel through such passage. In some embodiments, one or more such passages may extend all of the way through the housing 105, so as to create two gas outlet ports 120, as shown in FIG. 2.

Thermal pressure relief apparatus 100 may further comprise one or more heat input openings 130. A fragile bulb 140 may be positioned within the one or more heat input openings 130. Bulb 140 may contain a fluid 142. Fluid 142 preferably comprises a liquid. Heat input opening(s) 130 may allow for heat from outside of thermal pressure relief apparatus 100 to be transferred to the fluid 142 within bulb 140. In some embodiments, a heat transfer member—which may comprise an elongated piece of heat-conductive material—may extend from outside of housing 105 and contact bulb 140 to further facilitate such heat transfer. Some embodiments may be configured such that heat is transferred from one or more remote areas, such as one or more areas within an engine compartment of a vehicle, to bulb 140 (more particularly, to fluid 142 within bulb 140).

Bulb 140 may further be configured such that the fluid 142 within bulb 140 comprises a gas bubble 145. In some embodiments, fluid 142 may comprise, for example, glycerine. Gas bubble 145 may comprise, for example, air. In embodiments comprising a gas bubble, as discussed in further detail below, gas bubble 145 may be used as a proxy for determining an amount or volume of fluid within bulb 140. For example, a sensor, such as sensor 150 shown in FIG. 2, may be used to detect a size of the gas bubble 145, and thereby determine, at least approximately, an amount of fluid 142 remaining within bulb 140.

Sensor 150 may comprise any of a number of sensors available to those of ordinary skill in the art for detecting a condition of bulb 140. Examples of such sensors include, but are not limited to, optical sensors, capacitive sensors, and structure-borne noise sensors. As shown in the cross-sectional view of FIG. 2, sensor(s) 150 may, in some embodiments, be positioned within one or more of the heat input openings 130. In other embodiments, sensor(s) 150 may be positioned in alternative locations, such as directly on bulb 140, inside of housing 105, etc.

As mentioned above, in some embodiments, sensor 150 may be configured to detect a condition of bulb 140 by detecting a volume of fluid 142 within bulb 140, since a low volume of fluid 142 may be indicative of a crack and/or leak in bulb 140. In some embodiments sensor 150 may detect a volume of fluid 142 within bulb 140 by detecting a size of a gas bubble 145 within bulb 140. In alternative embodiments, sensor 150 may be configured to detect a condition of bulb 140 by directly detecting the presence of cracks and/or other structural weaknesses within the glass or other material making up bulb 140.

Sensor 150 may further comprise an antenna 152. Antenna 152 may be configured to transmit a signal, preferably a wireless signal, containing information about the condition of the bulb 140, such as a volume of fluid 142 within bulb 140. For example, in embodiments in which thermal pressure relief apparatus 100 is included within a vehicle, a signal may be transmitted from antenna 152 to one or more other systems within the vehicle. For example, upon reaching threshold conditions, such as a predetermined threshold volume of fluid 142 within bulb 140, a signal may be transmitted to a display system within the vehicle to notify a user, such as a driver or technician, that the thermal pressure relief apparatus is faulty, in need of repair, and/or in need of physical inspection.

Thermal pressure relief apparatus 100 may further comprise a piston 160 positioned within housing 105. Piston 160 may be configured to be moved between a closed position (depicted in FIG. 2) in which piston 160 blocks fluid communication between gas inlet port 110 and gas outlet port 120 and an open position in which gas outlet port 120 is in fluid communication with gas inlet port 110. In the embodiment depicted in FIG. 2, bulb 140 is positioned so as to keep piston 160 in the closed position while intact. However, once bulb 140 breaks, piston 160 is allowed to move to an open position in which piston 160 has slid to the left from the perspective of FIG. 2. In the embodiment of FIG. 2, the open position, although not depicted, comprises a configuration in which piston 160 generally occupies the space formerly occupied by bulb 140 such that a passage between gas outlet port 120 and gas inlet port 110 is unobstructed to allow gas from a gas vessel (not depicted) to exit the vessel.

In the embodiment depicted in FIG. 2, thermal pressure relief apparatus 100 further comprises a piston guide 165. Piston guide 165 allows piston 160 to slide therewithin such that, upon application of a sufficient amount of pressure, and typically in the absence of the intact bulb 140, piston 160 can slide within the confines of piston guide 165, as discussed above.

Figure 3:
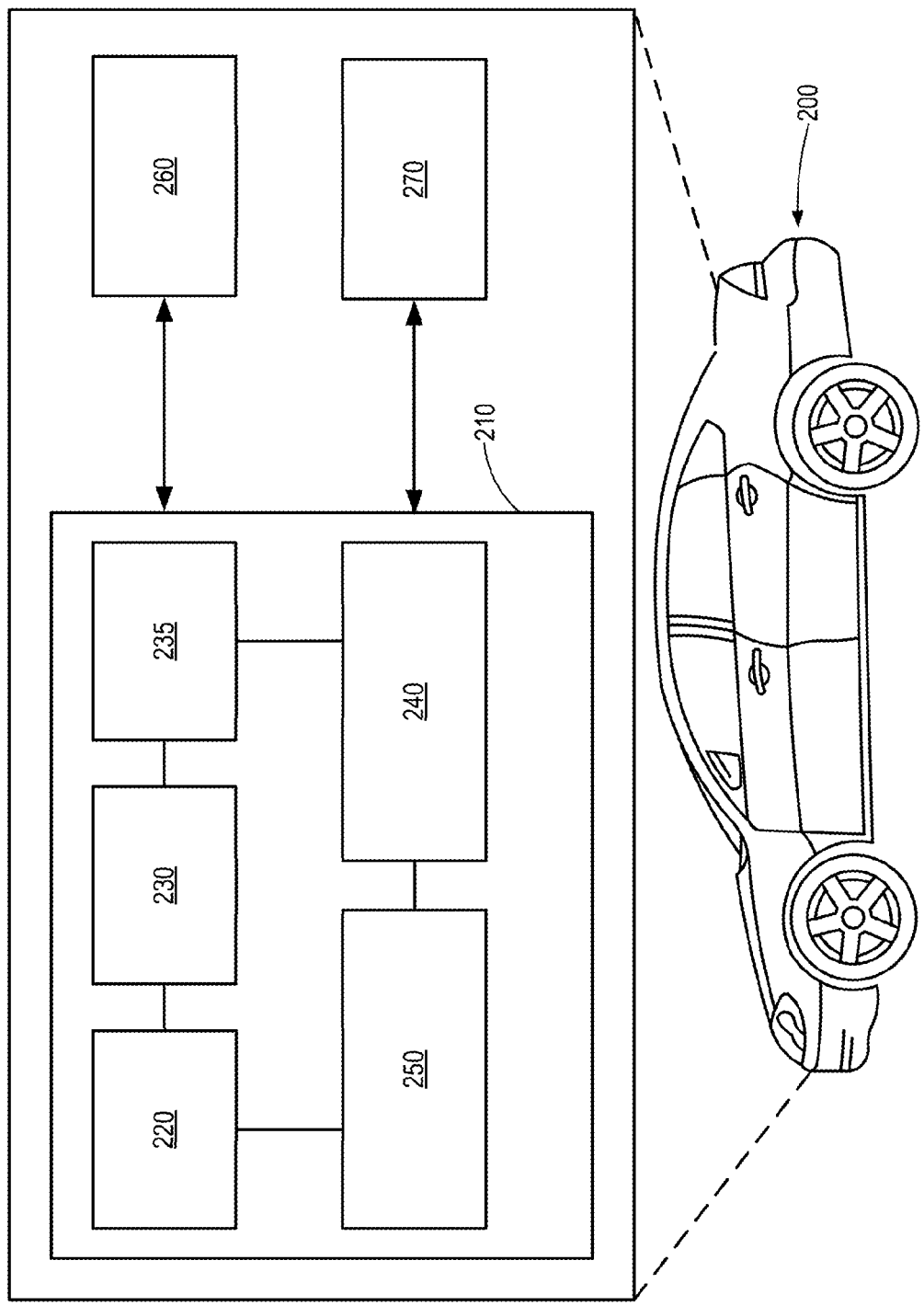
FIG. 3 illustrates an example of a vehicle comprising a thermal pressure relief apparatus.

FIG. 3 illustrates an example of a vehicle 200 comprising a thermal pressure relief apparatus. As shown in this figure, vehicle 200 may comprise a fuel cell system 210. Fuel cell system 210 may, in turn, comprise a vessel 220, a thermal pressure relief apparatus 230, a sensor 235, a control module 240, and a fuel cell stack 250. As described above, vessel 220 may comprise a gas, such as hydrogen gas, and may be coupled with thermal pressure relief apparatus 230 such that excessive pressure within vessel 220 will be relieved through thermal pressure relief apparatus 230, rather than resulting in an explosion or otherwise rupturing of vessel 220.

Thermal pressure relief apparatus 230 may comprise a sensor 235. It should be understood that sensor 235 may, in some embodiments, be a part of thermal pressure relief apparatus 230 and, in other embodiments, a separate sensor 235 may be utilized and operated in conjunction with thermal pressure relief apparatus 230. Sensor 235 may comprise, for example, an optical sensor, a capacitive sensor, or a structure-borne noise sensor.

Sensor 235 may be communicatively coupled with a control module 240. Control module 240 may comprise electronics for monitoring and/or controlling operation of fuel cell system 210. Control module 240 may be coupled with fuel cell stack 250 such that the electronics within control module 240 may be used to monitor and/or control the operation of fuel cell stack 250. Fuel cell stack 250 may comprise a first plurality of fuel cells each having an anode, a cathode and an electrolyte disposed therebetween.

Fuel cell system 210 may be communicatively coupled with an electric drive motor 260 and/or a vehicle display system 270. As such, information received from sensor may be transmitted to vehicle display system 270 in order to provide one or more alarms to a user as to a current status of thermal pressure relief apparatus 230. For example, upon detecting that a liquid within a bulb of thermal pressure relief apparatus 230 has gone below a threshold level, sensor 235 may be configured to transmit a signal to vehicle display system 270, which may cause vehicle display system 270 to, for example, emit an audible alarm, activate a warning light, or otherwise notify a driver and/or technician that thermal pressure relief apparatus 230 is not operating as expected and may need to be replaced and/or inspected further.

Figure 4:
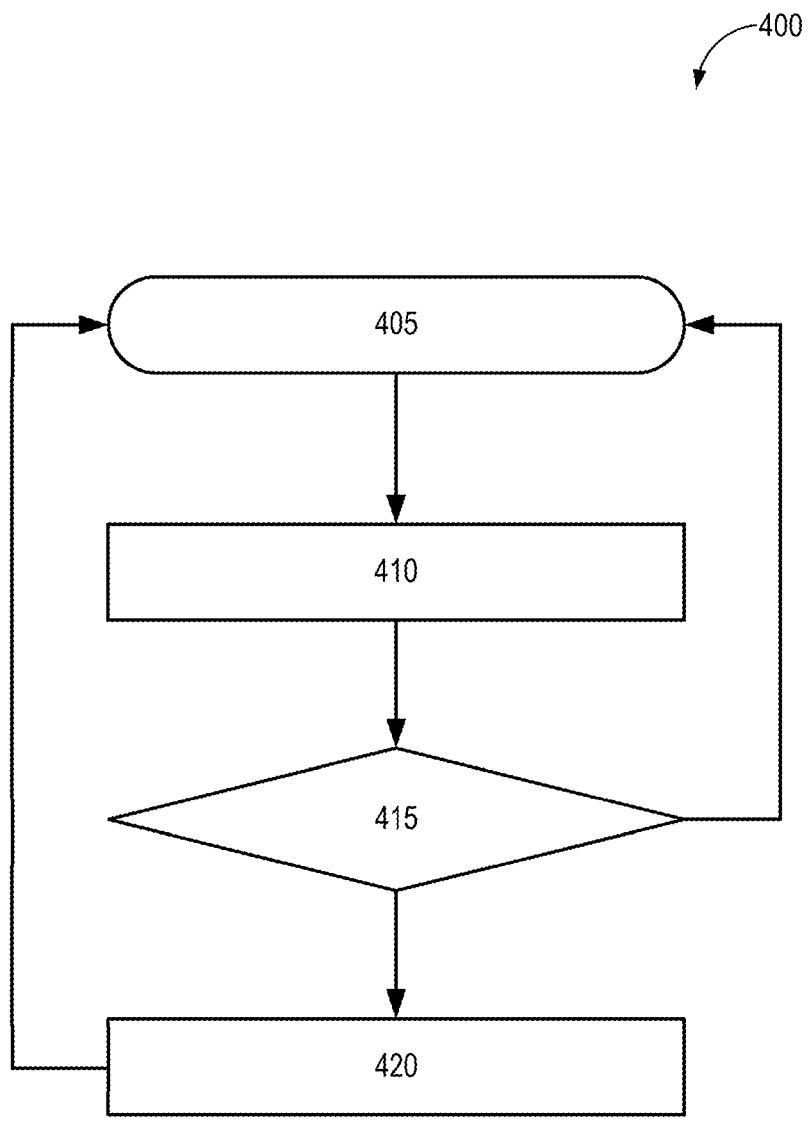
FIG. 4 is a flow chart illustrating an implementation of a method for inhibiting malfunction of a thermal pressure relief apparatus in a vehicle.

FIG. 4 is a flow chart illustrating an implementation of a method 400 for inhibiting malfunction of a thermal pressure relief apparatus in a vehicle. Method 400 begins at step 405. Step 410 may comprise inspecting a thermal pressure relief apparatus in a vehicle. In some implementations, step 410 may comprise sensing a volume of a fluid within a bulb of the thermal pressure relief apparatus using a sensor. In implementations in which the thermal pressure relief apparatus comprises a gas bubble within a fluid within a bulb, the step of sensing a volume of the fluid within the bulb using a sensor may comprise sensing a size of the gas bubble, since the size of the gas bubble in certain embodiments can be expected to increase in response to a decrease in the volume of fluid.

At step 415, a determination may be made as to whether a fluid within the bulb exceeds a fill level threshold. In some implementations, this determination can be made visually. In other implementations, this determination can be made by use of data obtained from a sensor. For example, data obtained from the sensor may be compared with a predetermined fill level threshold. One or more additional steps may be taken depending upon whether the volume/fill level exceeds the threshold.

For example, upon determining that the fluid is below the fill level threshold, method 400 may proceed to step 420, at which point an action may be taken to prevent or at least inhibit malfunction of the thermal pressure relief apparatus. In some implementations, the action may comprise one or more of providing a notification, deactivating a system associated with the thermal pressure relief apparatus, replacing the thermal pressure relief apparatus, and repairing the thermal pressure relief apparatus.

In implementations in which the action comprises a notification, the notification may comprise, for example, a visual notification, an audible notification, or a tactile notification. Examples of visual notifications include one or more lights, such as LED lights, an image on a display screen, etc. In some embodiments and implementations, the visual notification may be provided on the thermal pressure relief apparatus and/or an associated gas vessel/tank. In other embodiments and implementations, the visual notification may be provided on a related system, such as a display system of the vehicle. Examples of audible notifications include, for example, beeping noises, alarms, audible vibration, etc. As with the visual notifications, audible notifications may be provided on a speaker or other means for generating a noise that is provided on the thermal pressure relief apparatus and/or an associated gas vessel/tank or, alternatively, may be provided on a speaker or other device of the vehicle, in which case the thermal pressure relief apparatus may be interfaced with one or more vehicle systems to allow for communication therebetween. Examples of tactile notifications include, for example, vibration, minimal electrical shock, heat, etc., which may be provided, for example, on a steering wheel and/or gear shift of the vehicle.

In implementations in which the action comprises deactivating a system associated with the thermal pressure relief apparatus, the action may comprise, for example, deactivating a fuel cell system of the vehicle. In some implementations, such a drastic step may only be taken in response to multiple criteria. For example, some embodiments and implementations may be configured to deactivate a fundamental system of a vehicle only in response to receiving both a notification that the thermal pressure relief apparatus is likely dysfunctional and a separate notification that a temperature associated with the thermal pressure relief apparatus has exceeded a threshold temperature.

After an action is taken to prevent or at least inhibit malfunction of the thermal pressure relief apparatus at step 420, the method 400 may return to step 405 and begin again. If, on the other hand, at step 415 it is determined that the fluid level is above the fill level threshold, method 400 may return to step 405 after step 415, as shown in FIG. 4.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A thermal pressure relief apparatus, comprising:
a housing;
a gas inlet port configured to be fluidly coupled with a vessel comprising a gas;
a gas outlet port fluidly coupled with the gas inlet port;
a piston configured to be moved between a closed position in which the piston blocks fluid communication between the gas inlet port and the gas outlet port and an open position in which the gas outlet port is in fluid communication with the gas inlet port;
a bulb positioned so as to keep the piston in the closed position, wherein the bulb is configured such that, once the bulb breaks, the piston is allowed to move to the open position; and
a sensor configured to detect a condition of the bulb, wherein the sensor is configured to detect the condition prior to the bulb breaking to allow the piston to move to the open position.

2. The thermal pressure relief apparatus of claim 1, wherein the bulb comprises a glass bulb.

3. The thermal pressure relief apparatus of claim 1, wherein the sensor comprises at least one of an optical sensor, a capacitive sensor, and a structure-borne noise sensor.

4. The thermal pressure relief apparatus of claim 1, wherein the condition comprises the presence of a crack in the bulb.

5. The thermal pressure relief apparatus of claim 1, wherein the condition comprises a volume of a fluid within the bulb.

6. The thermal pressure relief apparatus of claim 5, wherein the bulb comprises a gas bubble within the fluid when the bulb is intact.

7. The thermal pressure relief apparatus of claim 6, wherein the sensor is configured to detect a volume of a fluid within the bulb by detecting a size of the gas bubble.

8. The thermal pressure relief apparatus of claim 1, further comprising at least one heat input opening positioned adjacent to the bulb.

9. The thermal pressure relief apparatus of claim 8, wherein the sensor is positioned within the at least one heat input opening.

10. A vehicle, comprising:
a gas vessel comprising a gas, wherein the gas vessel comprises a vessel outlet port; and
a thermal pressure relief apparatus coupled with the gas vessel, wherein the thermal pressure relief apparatus comprises:
a gas inlet port fluidly coupled with the vessel outlet port;
a gas outlet port fluidly coupled with the gas inlet port;
a piston configured to be moved between a closed position in which the piston blocks fluid communication between the gas inlet port and the gas outlet port and an open position in which the gas outlet port is in fluid communication with the gas inlet port;
a bulb positioned so as to keep the piston in the closed position, wherein the bulb is configured such that, once the bulb breaks, the piston is allowed to move to the open position; and
a sensor configured to detect a non-zero volume of a fluid within the bulb.

11. The vehicle of claim 10, wherein the gas vessel comprises a hydrogen gas vessel.

12. The vehicle of claim 11, wherein the vehicle comprises a fuel cell electric vehicle.

13. The vehicle of claim 10, wherein the fluid comprises a gas bubble, and wherein the sensor is configured to detect the volume of the fluid by detecting a size of the gas bubble.

14. A method for inhibiting malfunction of a thermal pressure relief apparatus in a vehicle, the method comprising the steps of:
inspecting a thermal pressure relief apparatus in a vehicle, wherein the thermal pressure relief apparatus comprises a bulb;
determining whether a fluid within the bulb exceeds a fill level threshold; and
upon determining that the fluid is below the fill level threshold, taking an action comprising at least one of providing a notification, deactivating a system associated with the thermal pressure relief apparatus, replacing the thermal pressure relief apparatus, and repairing the thermal pressure relief apparatus, wherein the step of inspecting the thermal pressure relief apparatus comprises sensing a volume of the fluid within the bulb using a sensor.

15. The method of claim 14, wherein the sensor comprises at least one of an optical sensor, a capacitive sensor, and a structure-borne noise sensor.

16. The method of claim 14, wherein the fluid within the bulb comprises a gas bubble.

17. The method of claim 16, wherein the step of sensing a volume of the fluid within the bulb using a sensor comprises sensing a size of the gas bubble.

18. The method of claim 14, wherein the action comprises a notification, and wherein the notification comprises at least one of a visual notification and an audible notification.

19. The method of claim 18, wherein the notification comprises a visual notification, and wherein the visual notification comprises a warning light.

* * * * *